United States Patent [19]

Yukimoto et al.

[11] Patent Number: 4,468,063
[45] Date of Patent: Aug. 28, 1984

[54] DRIVE MECHANISM FOR A VEHICLE SUNROOF

[75] Inventors: Kazuyoshi Yukimoto, Kariya; Keiji Mori, Toyota; Mitsuyoshi Masuda, Nagoya, all of Japan

[73] Assignee: Aisin Seiki Kabushiki Kaisha, Japan

[21] Appl. No.: 407,626

[22] Filed: Aug. 12, 1982

[30] Foreign Application Priority Data

Aug. 13, 1981 [JP] Japan .................. 56-127289

[51] Int. Cl.³ ............................................. B60J 7/04
[52] U.S. Cl. ...................................... 296/223; 74/804
[58] Field of Search .................. 296/223; 49/349; 74/804

[56] References Cited

U.S. PATENT DOCUMENTS 398,214  2/1889  Autenrieth ...................... 74/804
4,272,125  6/1981  Bienert et al. ...................... 296/223

FOREIGN PATENT DOCUMENTS 1906084  10/1970  Fed. Rep. of Germany.

Primary Examiner—Robert R. Song
Attorney, Agent, or Firm—Banner, Birch, McKie & Beckett

[57] ABSTRACT

A drive mechanism for a vehicle sunroof having a roof panel, the drive mechanism providing for accurate and reliable shut-off of the sunroof drive motor when the roof panel reaches either its fully closed or fully open position. The drive mechanism includes a rotatable cam plate which is mounted directly on the housing of the drive mechanism, the drive mechanism being installable as a unit in the sunroof assembly and the cam plate actuating limit switches for controlling the motor.

24 Claims, 5 Drawing Figures

DRIVE MECHANISM FOR A VEHICLE SUNROOF

BACKGROUND OF THE INVENTION

1. Field of the Invention

This invention relates generally to drive mechanisms for vehicle sunroofs and, more particularly, to a drive mechanism for a vehicle sunroof having means for detecting the fully open and fully closed positions of the movable roof panel of the sunroof and shutting off the sunroof drive motor when the roof panel reaches either of its limits of movement.

2. Description of the Prior Art

A typical vehicle sunroof of the sliding type usually includes a roof panel which slidably moves beneath the stationary roof portion of the vehicle to reveal an opening in the roof. The movable roof panel usually is mounted on shoes which slidably engage guide rails provided along the sides of the sunroof frame. Movement of the panel is effected, in the case of powered units, by a drive motor which acts through a transmission to drive a pair of push-pull cables, each of which is coupled to the shoes on either side of the sunroof opening.

The drive motor of a powered sunroof is susceptible to overloading and burnout if electrical power continues to be delivered to the motor after the roof panel has reached either of its limits of movement, i.e., either its fully closed or fully open position. In order to prevent such overloading, means usually is provided for detecting the end positions of the roof panel and shutting off the motor when these limits are reached. Limit switches usually are positioned adjacent the path of travel of the roof panel, these switches directly sensing the presence of the panel when it reaches either limit of movement. In installing this type of sunroof, however, it is often quite difficult initially to adjust the positions of the switches relative to the sunroof opening so that they correctly sense the end positions of the slidable roof panel. This is due to the fact that the switches, which must be installed before the roof panel, become concealed once the roof panel has been installed. In most cases, due to manufacturing and assembly inaccuracies, repeated adjustment is required at the time of sunroof installation. This results in excessive manufacturing time for each vehicle. Also contributing to excessive manufacturing time is the necessity of separately installing limit switches and associated connectors—additional parts which augment an already lengthy list of parts for any contemporary automobile.

Another type of roof panel position detector is disclosed in West German Pat. No. 19 06 084, published Oct. 15, 1970. In the sunroof there disclosed, a pinion meshes with one of the sunroof drive cables and is rotated whenever the roof panel moves. A worm gear is mounted on the pinion shaft, and a longitudinally slidably guided, internally threaded collar surrounds and meshes with the worm gear. The collar has two trip cams which actuate adjacent limit switches to control the drive motor when the collar is moved longitudinally by the action of the driven pinion and the engaged threaded surfaces of the worm and collar. This detection mechanism significantly reduces the need for repeated roof panel removal and adjustment, but does not solve other problems associated with sunroof mechanisms. For example, the detection mechanism itself constitutes one more item which requires installation time in the vehicle, occupies additional space in an area where space is at a premium, and requires separate access through the sunroof frame for installation and removal for repair or replacement.

SUMMARY OF THE INVENTION

It is therefore an object of the present invention to obviate the above noted disadvantages and shortcomings of the prior art by providing a mechanism for reliably and accurately detecting the end positions of a sunroof panel without the need for readjustment once the panel is installed in the vehicle roof.

Another object of the invention is to provide such a mechanism which occupies very little space, requires no separate access for installation or removal, and requires no additional installation time in the vehicle.

Another object of the invention is to provide such a mechanism which can be preassembled and properly adjusted before installation in the vehicle.

Another object of the invention is to provide such a mechanism which is an integral part of a unitary drive mechanism for the vehicle sunroof.

These and other objects of the present invention are accomplished by providing a drive mechanism for a vehicle sunroof having a movable roof panel, the drive mechanism comprising a motor and a rotatable drive shaft operatively coupled to and driven by the motor. Transmission means is connected to the drive shaft, and is adapted to be operatively coupled to the movable roof panel, for transmitting motive power from the drive shaft to the roof panel. Roof panel position indicating means has indicia corresponding to the limits of movement of the roof panel, and is driven by reduction gear means which interconnects the drive shaft and the indicating means and effects movement of the indicating means at a reduced rate. Switch means is provided which is operatively coupled to the indicating means, senses the position of the indicia and shuts off the motor when the roof panel reaches either of its limits of movement.

Preferably the drive mechanism of the invention is adapted to be installed as a single unit in the sunroof. To this end, the drive mechanism comprises a housing to which the motor is attached and in which the drive shaft is journaled. The transmission means also is contained within the housing, and the other elements are physically associated with the housing such that the entire drive mechanism may be installed or removed as a unit.

BRIEF DESCRIPTION OF THE DRAWINGS

The novel features of the invention are set out with particularity in the appended claims, but the invention will be understood more fully and clearly from the following detailed description of the invention as set forth in the accompanying drawings, in which:

DETAILED DESCRIPTION

Figure 1:
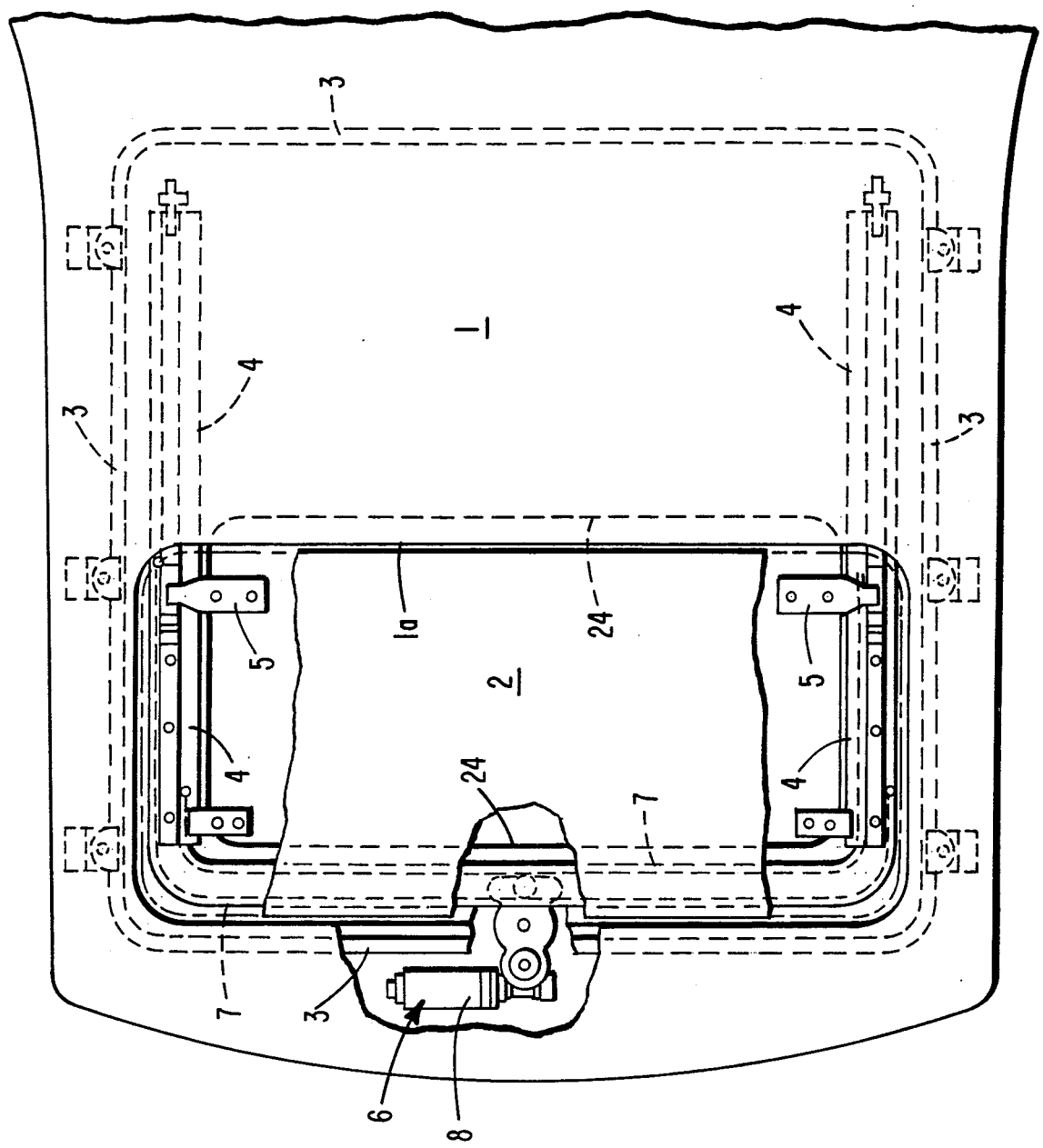
FIG. 1 is a plan view of a vehicle sunroof and a drive mechanism therefor according to the present invention.

Referring to FIG. 1, a vehicle roof 1 has a sunroof opening 1a in which is situated a slidable roof panel 2. Roof panel 2 also covers a rearwardly offset opening 24 in the vehicle headliner or inner roof. The end portions of roof panel 2 are broken away in FIG. 1 to reveal the underlying structure. Roof panel 2 is retractable beneath roof 1 to open roof opening 1a and headliner opening 24. A frame 3 is situated below roof 1 and surrounds the front and sides of opening 1a and the sides and rear of the retracted position of roof panel 2. Weatherstripping (not shown) is provided around the perimeter of roof opening 1a, and is adapted to close the gap between opening 1a and the periphery of roof panel 2 and inhibit leakage of wind and water, in a known conventional manner. Conventional drainage channels (also not shown) are provided for carrying away any rain water which may accumulate within frame 3.

Frame 3 is provided with a pair of guide rails 4 along which roof panel 2 is guided. Roof panel 2 is supported on a number of shoes 5 secured to the inside of the panel. Each shoe is slidably disposed on and retained by guide rails 4. Movement of roof panel 2 is effected by a pair of toothed drive cables 7, the ends of which are attached to shoes 5. Cables 7 are a known type of push-pull cable normally used in sunroof drives, having a spiral wire wound around the cable core. A drive mechanism 6 is secured to frame 3 by bolts or other suitable fasteners (not shown) and operatively engages the spirals of cables 7 to move roof panel 2 fore and aft.

Figure 2:
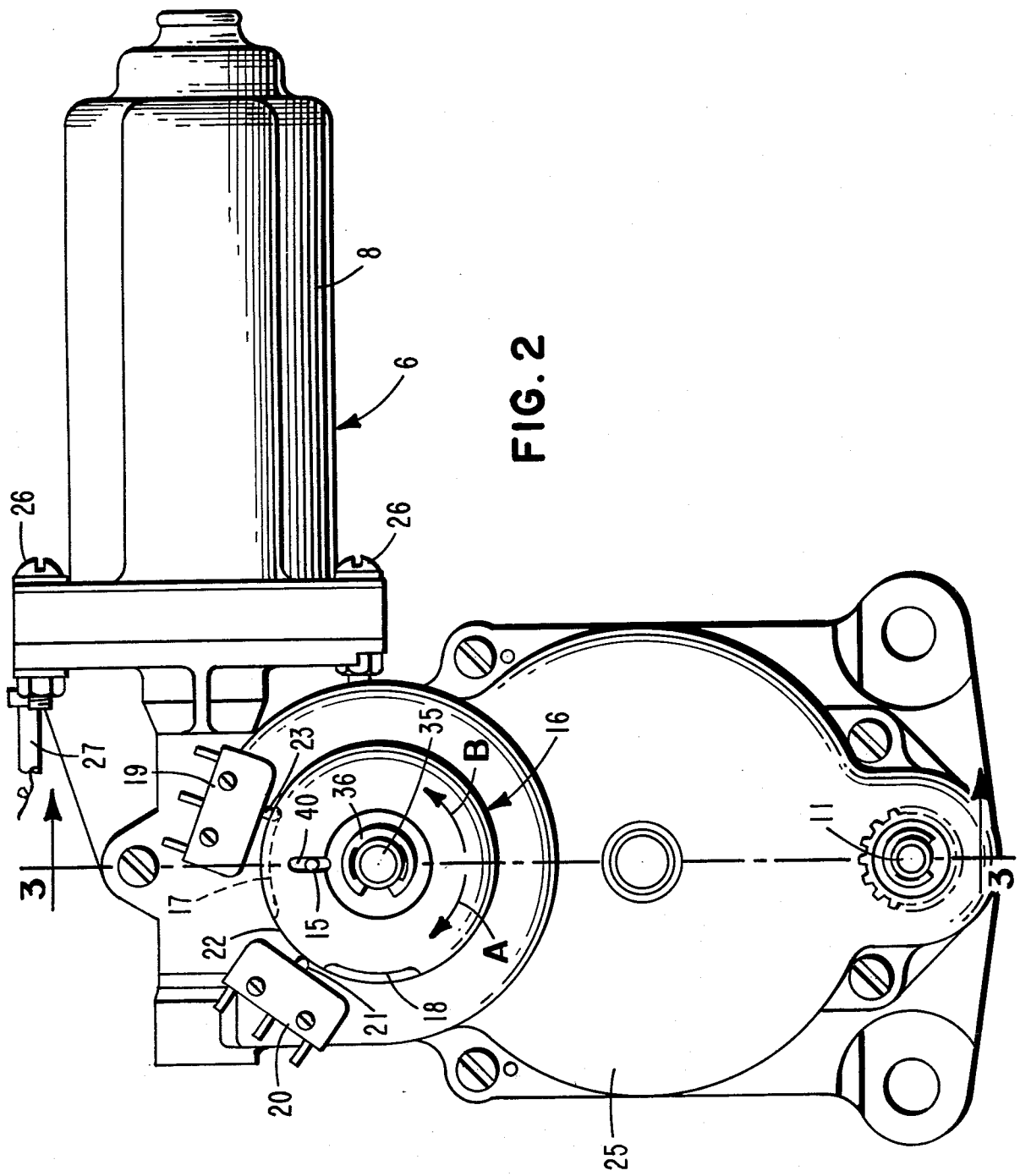
FIG. 2 is a plan view of the drive mechanism itself.
Figure 3:
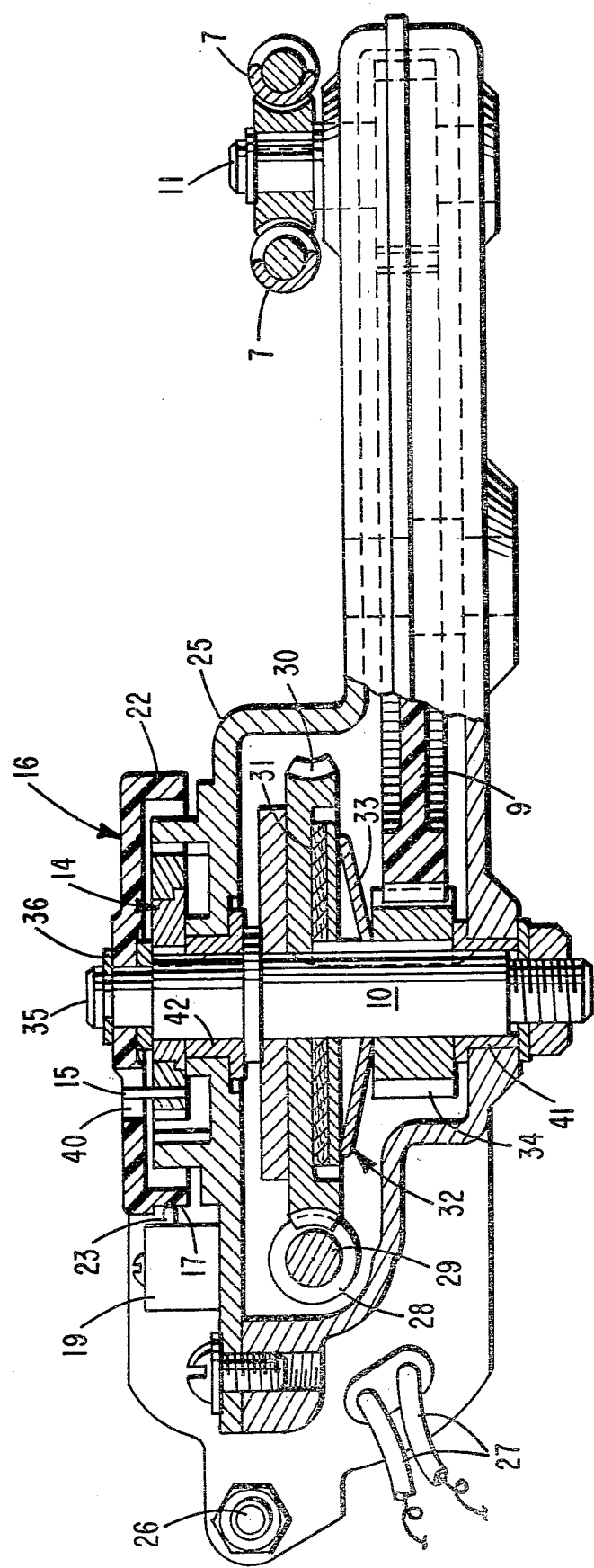
FIG. 3 is a sectional view of the drive mechanism taken along line 3—3 in FIG. 2.

Referring to FIGS. 2 and 3, drive mechanism 6 includes a housing 25 to which an electric motor 8 is secured by bolts 26. Electric power is delivered to motor 8 through leads 27. A worm gear 28 mounted on motor shaft 29 engages a roller gear 30 which is freely rotatable about a drive shaft 10. Drive shaft 10 is journaled in bearings 41, 42 which are secured in housing 25. The lower face of roller gear 30 engages the friction disk 31 of a clip clutch 32. Slip clutch 32 has a conical spring 33 which bears against the upper surface of a pinion 34 and urges friction disk 31 into engagement with roller gear 30. Slip clutch 32 and pinion 34 are keyed to drive shaft 10. Motive power is delivered by rotating pinion 34 to cables 7 by means of a reduction gear 9 and a geared output shaft 11, both of which are journaled in housing 25.

Figure 4:
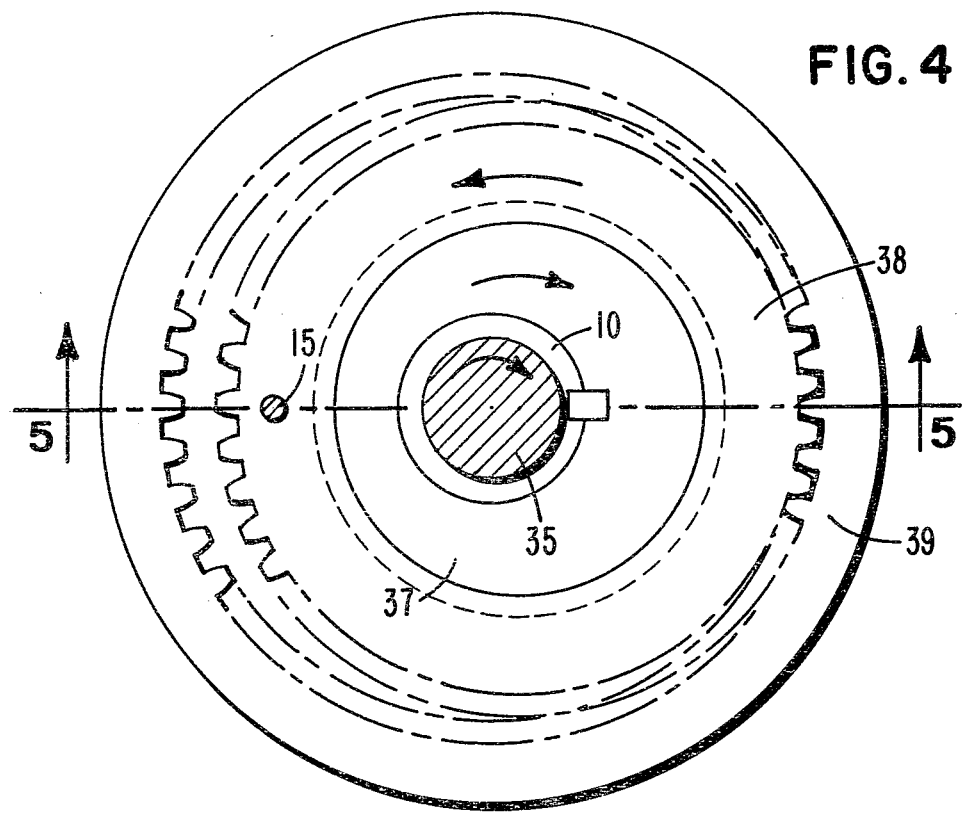
FIG. 4 is a plan view of a reduction gear which forms a part of the drive mechanism.
Figure 5:
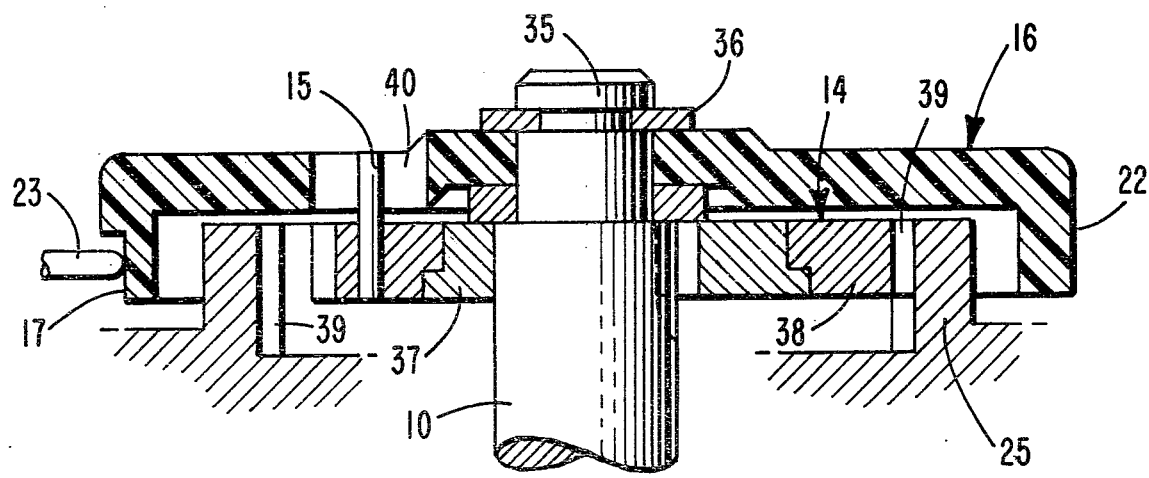
FIG. 5 is a sectional view of the reduction gear and the element driven thereby taken along line 5—5 in FIG. 4.

The roof panel position indicating mechanism now will be described with reference to FIGS. 3, 4 and 5. The upper end of drive shaft 10 drives a cam plate 16 which is rotatable coaxially of drive shaft 10 and is retained on a grooved extension 35 of drive shaft 10 by a snap ring 36. Cam plate 16 is driven by drive shaft 10 through a reduction gear 14 so that it slowly travels through a predetermined arc of rotation between the fully open and fully closed positions of roof panel 2. Reduction gear 14 is a so-called "KHV" planetary gear reduction unit. Gear reduction systems of this type have been used in, for example, automobile window regulator systems. Gear reduction unit 14 comprises an eccentric drive cam 37 keyed to drive shaft 10. Cam 37 slidably rotates within an externally toothed planetary ring gear 38. The teeth of ring gear 38 mesh with the internal teeth of a stationary sun gear 39, which is fixed to housing 25 and is coaxial with drive shaft 10. As seen in FIG. 4, clockwise rotation of cam 37 causes counterclockwise rotation of ring gear 38 as it meshes with the teeth of sun gear 38, but at a greatly reduced rate. The motion of ring gear 38 is transmitted to cam plate 16 by a pin 15 which is secured to planetary gear 38 and engages a slot 40 in cam plate 16.

Cam plate 16 is provided with a peripheral cam surface 22 including two cam grooves 17, 18 at separate circumferential and elevational positions on its periphery. Cam groove 18 is higher than cam groove 17. A pair of microswitches 19, 20 are secured to housing 25 adjacent cam surface 22. Switch 19 has an actuator 23 which is adapted to contact cam surface 22, while switch 20 has an actuator 21 which also is adapted to contact cam surface 22. The open or closed conditions of switches 19, 20 are controlled by contact of actuators 23, 21 with the cam surface 22.

The operation of the drive mechanism now will be described with reference to FIG. 2. Actuator 21 of microswitch 20 is there illustrated as engaged with the cam surface 22 of cam plate 16, but not in contact with cam groove 18. Switch 20 therefore is actuated to indicate that roof panel 2 is in its fully closed position, and will disconnect electric power to motor 8 through known conventional circuitry. When motor 8 is operated in reverse to slide panel 2 to its fully open position, cam plate 16 is rotated in the direction of arrow A to place cam groove 18 in contact with actuator 21. During this movement, contact 23 of switch 19 rides along cam groove 17. At the point where panel 2 reaches its fully open position, actuator 23 rides up out of cam groove 17 onto the outer periphery of cam surface 22. Switch 19 therefore is actuated to disconnect electric power from motor 8. At the same time, actuator 21 of switch 20 is engaged with cam groove 18, and is actuated to permit reverse rotation of cam plate 16 (in the direction of arrow B) when the operator desires to close roof panel 2. At substantially any intermediate position of roof panel 2, actuators 21, 23 are engaged with their respective cam grooves 18, 17 to actuate switches 20, 19 so that roof panel 2 can selectively be moved in either direction.

The above-described mechanism readily accomplishes the stated objectives. The unitary nature of the drive mechanism, with its preadjusted switches and cam plate, enable it to be installed quickly and easily with no adjustment required subsequent to installation of the roof panel 2. Once drive mechanism 6 is installed on frame 3 and coupled to cables 7, with the cam plate 16 in the position corresponding to the fully closed position of roof panel 2, all that is required is the installation of roof panel 2 on guides 5 in the closed position. Should repair of replacement of the drive mechanism be required, it is a simple matter to remove it as a whole from frame 3 with little disruption. The roof panel position detector (cam plate, switches, etc.) occupies very little space, requires no separate access for installation or removal, and requires no additional installation time in the vehicle.

It will be apparent to those skilled in the art that numerous changes and modifications may be made within the scope of the invention. For example, cam plate 16 may take the form of any type of roof panel position indicating member having indicia corresponding to the limits of movement of the roof panel. Hence, cam plate 16 may take the form of a rotatable disc having two permanent magnets located at predetermined positions on its periphery, the magnets causing actuation of Hall effect sensors or reed switches when in close proximity thereto. Alternatively, plate 16 may have two apertures at predetermined locations, with an optical sensor or sensors positioned thereabove to "read" the location of the apertures and trigger switches accordingly. Any type of reduction gear may be used to produce a slow rotation of cam plate 16. Other variations and modifications will be apparent to those skilled in the art without departing from the true spirit and scope of the invention, which is to be limited only by the appended claims.

We claim:

1. A drive mechanism for a vehicle sunroof having a movable roof panel, the drive mechanism comprising:
   a motor;
   a rotatable drive shaft operatively coupled to and driven by said motor;
   transmission means connected to said drive shaft, and adapted to be operatively coupled to said movable roof panel, for transmitting motive power from said drive shaft to said roof panel;
   a rotatable indicating member having on its periphery two cam grooves which are circumferentially and axially offset from one another, a portion of each of said cam grooves corresponding to a limit of movement of said roof panel;
   reduction gear means interconnecting said drive shaft and said indicating member for effecting rotary movement of said indicating member at a reduced rate; and
   switch means operatively coupled to said cam grooves for sensing the position of said cam grooves and shutting off said motor when said roof panel reaches either of its limits of movement.

2. A drive mechanism according to claim 1 wherein said indicating member is rotatable coaxially of said drive shaft.

3. A drive mechanism according to claim 2 wherein said reduction gear means is a planetary gear reduction mechanism which is generally coaxial with said drive shaft and said rotatable indicating member.

4. A drive mechanism according to claim 3 wherein said reduction gear means is a KHV gear reduction mechanism.

5. A drive mechanism according to claim 1 wherein said indicating member comprises a rotatable cam plate, and said switch means has actuating means in contact with said cam grooves.

6. A drive mechanism according to claim 5 wherein said reduction gear means is a planetary gear reduction mechanism which is generally coaxial with said drive shaft and said cam plate.

7. A drive mechanism according to claim 6 wherein said reduction gear means is a KHV gear reduction mechanism.

8. A drive mechanism according to claim 7 wherein said switch means comprises two switches, and said actuating means comprises an actuating member of each switch in contact with said cam grooves, one of said switches being actuated by one of said cam grooves to shut off said motor when said roof panel reaches its fully open position, and the other of said switches being actuated by the other of said cam grooves to shut off said motor when said roof panel reaches its fully closed position.

9. A unitary drive mechanism for a vehicle sunroof having a movable roof panel, the drive mechanism adapted to be installed as a single unit in the sunroof and comprising:
   a housing;
   a motor attached to said housing;
   a rotatable drive shaft journaled in said housing and operatively coupled to and driven by said motor;
   transmission means within said housing connected to said drive shaft, and adapted to be operatively coupled to said movable roof panel, for transmitting motive power from said drive shaft to said roof panel;
   a rotatable indicating member having on its periphery two cam grooves which are circumferentially and axially offset from one another, a portion of each of said cam grooves corresponding to a limit of travel of said roof panel;
   reduction gear means, associated with said housing, interconnecting said drive shaft and said indicating member means for effecting rotary movement of said indicating member at a reduced rate; and
   switch means connected to said housing and operatively coupled to said cam grooves for sensing the position of said cam grooves and shutting off said motor when said roof panel reaches either of its limits of movement.

10. A drive mechanism according to claim 9 wherein said indicating member is rotatable coaxially of said drive shaft.

11. A drive mechanism according to claim 10 wherein said reduction gear means is a planetary gear reduction mechanism which is generally coaxial with said drive shaft and said rotatable indicating member.

12. A drive mechanism according to claim 11 wherein said reduction gear means is a KHV gear reduction mechanism.

13. A drive mechanism according to claim 9 wherein said indicating member comprises a rotatable cam plate, and said switch means has actuating means in contact with said cam grooves, said cam plate being mounted for rotation externally of said housing.

14. A drive mechanism according to claim 13 wherein said reduction gear means is a planetary gear reduction mechanism which is generally coaxial with said drive shaft and said cam plate.

15. A drive mechanism according to claim 14 wherein said reduction gear means is a KHV gear reduction mechanism.

16. A drive mechanism according to claim 15 wherein said switch means comprises two switches mounted on said housing, and said actuating means comprises an actuating member of each switch in contact with said cam grooves, one of said switches being actuated by one of said cam grooves to shut off said motor when said roof panel reaches its fully open position, and the other of said switches being actuated by the other of said cam grooves to shut off said motor when said roof panel reaches its fully closed position.

17. In a vehicle roof having a slidable sunroof panel arranged to close and open a framed roof opening, and an opening and closing mechanism therefor, the improvement wherein said opening and closing mechanism includes a unitary drive mechanism installed as a single unit on said frame, said drive mechanism comprising:
   a housing secured to said frame;
   a motor attached to said housing;
   a rotatable drive shaft journalled in said housing and operatively coupled to and driven by said motor;
   transmission means within said housing connected to said drive shaft and operatively coupled to said movable roof panel, for transmitting motive power from said drive shaft to said roof panel;

a rotatable indicating member having on its periphery two cam grooves which are circumferentially and axially offset from one another, a portion of each of said cam grooves corresponding to a limit of travel of said roof panel;

reduction gear means, associated with said housing, interconnecting said drive shaft and said indicating member for effecting rotary movement of said indicating member at a reduced rate; and switch means connected to said housing and operatively coupled to said cam grooves for sensing the position of said cam grooves and shutting off said motor when said roof panel reaches either of its limits of movement.

18. A vehicle roof according to claim 17 wherein said indicating member is rotatable coaxially of said drive shaft.

19. A vehicle roof according to claim 18 wherein said reduction gear means is a planetary gear reduction mechanism which is generally coaxial with said drive shaft and said rotatable indicating member.

20. A vehicle roof according to claim 19 wherein said reduction gear means is a KHV gear reduction mechanism.

21. A vehicle roof according to claim 17 wherein said indicating member comprises a rotatable cam plate and said switch means has actuating means in contact with said cam grooves, said cam plate being mounted for rotation externally of said housing.

22. A vehicle roof according to claim 21 wherein said reduction gear means is a planetary gear reduction mechanism which is generally coaxial with said drive shaft and said cam plate.

23. A vehicle roof according to claim 22 wherein said reduction gear means is a KHV gear reduction mechanism.

24. A vehicle roof according to claim 23 wherein said switch means comprises two switches mounted on said housing, and said actuating means comprises an actuating member of each switch in contact with said cam grooves, one of said switches being actuated by one of said cam grooves to shut off said motor when said roof panel reaches its fully open position, and the other of said switches being actuated by the other of said cam grooves to shut off said motor when said roof panel reaches its fully closed position.

* * * * *